United States Patent [19]

Thompson

[11] Patent Number: 4,696,542
[45] Date of Patent: Sep. 29, 1987

[54] ARMORED OPTICAL FIBER CABLE

[75] Inventor: Robert E. Thompson, Roanoke, Va.

[73] Assignee: Chevron Research Company, San Francisco, Calif.

[21] Appl. No.: 679,195

[22] Filed: Dec. 7, 1984

Related U.S. Application Data

[63] Continuation-in-part of Ser. No. 408,975, Aug. 17, 1982.

[51] Int. Cl.⁴ .............................................. G02B 6/44
[52] U.S. Cl. ............................................... 350/96.23
[58] Field of Search ............... 350/96.23; 174/70 R, 174/70 S, 107, 108, 109, 104; 367/25

[56] References Cited

U.S. PATENT DOCUMENTS

| | | | |
|---|---|---|---|
| 3,883,218 | 5/1975 | Slaughter | 350/96 B |
| 3,955,878 | 5/1976 | Nowak | 350/96 R |
| 4,039,248 | 8/1977 | Franke et al. | 350/96 B |
| 4,078,853 | 3/1978 | Kempf et al. | 350/96.23 |
| 4,093,342 | 6/1978 | Foord et al. | 350/96.23 |
| 4,113,349 | 9/1978 | Stiles | 350/96.23 |
| 4,156,104 | 5/1979 | Mondello | 174/70 R |
| 4,158,478 | 6/1979 | D'Auria et al. | 350/96.23 |
| 4,250,351 | 2/1981 | Bridges | 174/106 R |
| 4,317,000 | 2/1982 | Ferer | 350/96.23 |
| 4,359,598 | 11/1982 | Dey et al. | 174/40 R |
| 4,367,917 | 1/1983 | Gray | 350/96.23 |
| 4,389,088 | 6/1983 | Frezequet | 350/96.23 |
| 4,422,718 | 12/1983 | Nakagome et al. | 350/96.23 |
| 4,504,112 | 3/1985 | Gould et al. | 350/96.23 |
| 4,522,464 | 6/1985 | Thompson et al. | 350/96.23 |
| 4,523,804 | 6/1985 | Thompson | 350/96.23 |
| 4,557,560 | 12/1985 | Bohannon, Jr. et al. | 350/96.23 |
| 4,606,604 | 8/1986 | Soodak | 350/96.23 |
| 4,651,917 | 3/1987 | Gould | 350/96.23 |

FOREIGN PATENT DOCUMENTS

| | | | |
|---|---|---|---|
| 2036361 | 10/1979 | United Kingdom . | |
| 2085187 | 4/1982 | United Kingdom | 350/96.23 |
| 2084757 | 4/1982 | United Kingdom | 350/96.23 |
| 2088584 | 6/1982 | United Kingdom | 350/96.23 |
| 2104752 | 3/1983 | United Kingdom . | |

OTHER PUBLICATIONS

Kojima et al. "Submarine Optical Fiber Cable . . . ", Applied Optics, vol. 21, No. 5, 3/82, pp. 815-821.
Copperwald Bimetallics Group, Publ No. 183-6-81.
Fiber Optic Data Transmission System for Borehole Logging, Final Report, Aug. 14, 1981, DOE Contract 78-241-S.
Evaluation of Optical Fiber Cable for Transmission for Subsurface Drill Hole Logging Data/Report on Phase 1-B-Dec. 19, 1979 (DOE 78-241-S).

*Primary Examiner*—William L. Sikes
*Assistant Examiner*—Brian M. Healy
*Attorney, Agent, or Firm*—S. R. LaPaglia; E. J. Keeling; A. S. Zavell

[57] ABSTRACT

An optical well logging cable and method of fabrication is provided which utilizes the combination of optical fiber means having a proof test stress value of at least about 150,000 pounds per square inch with a surrounding and protecting arrangement of helically wound strength elements in a construction that minimizes the inelastic part of the cable elongation by minimizing the deformability of the structure within the arrangement of strength elements. This arrangement of strength elements includes two torque balancing layers wound in opposite helical directions. It is a feature of this invention that the construction has such a low permanent radial contraction under repeated loading to about 90% of the design breaking strength of the cable that its permanent elongation is no greater than about 0.4% and preferably 0.25% or less.

10 Claims, 4 Drawing Figures

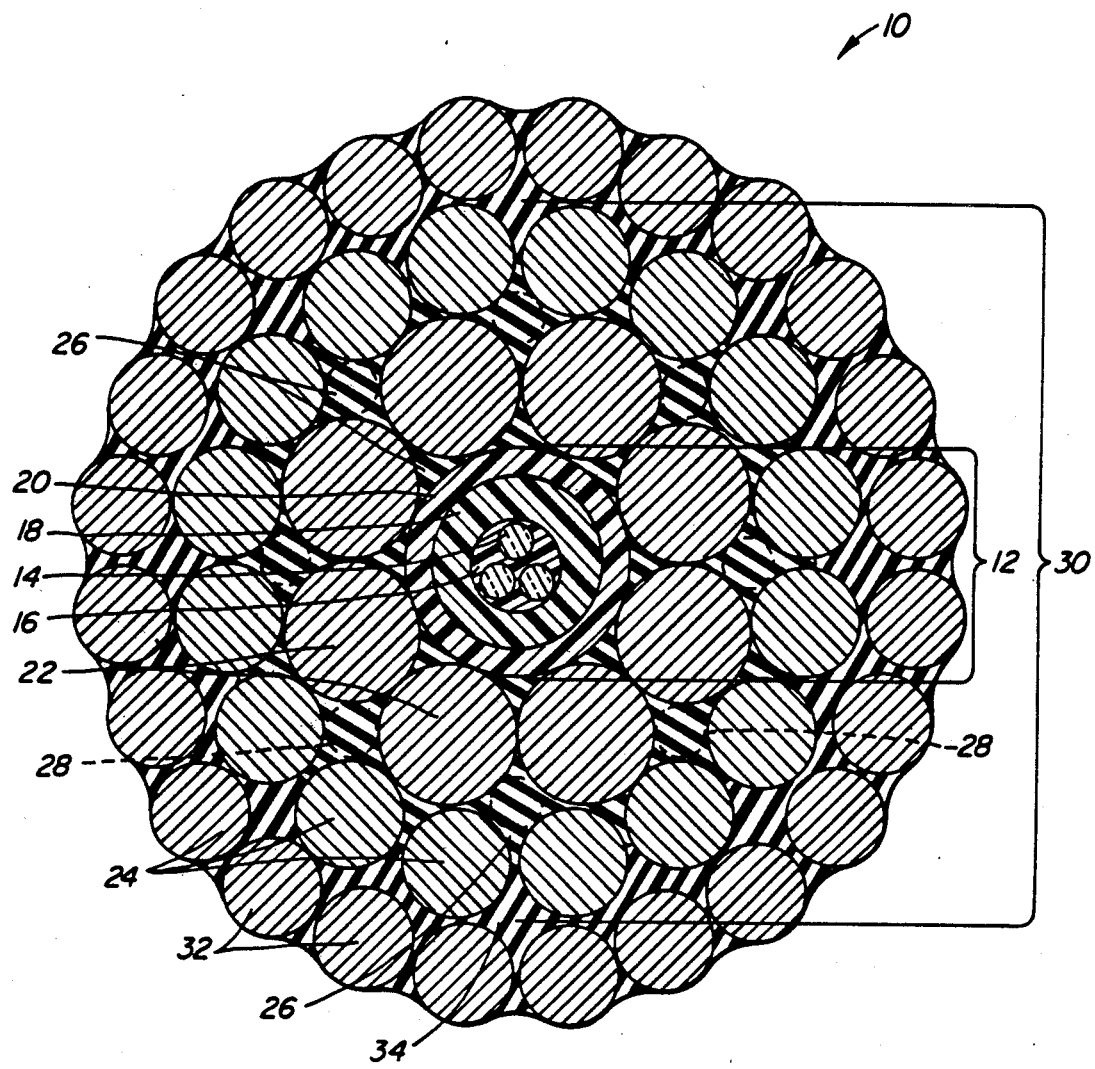
FIG._1.

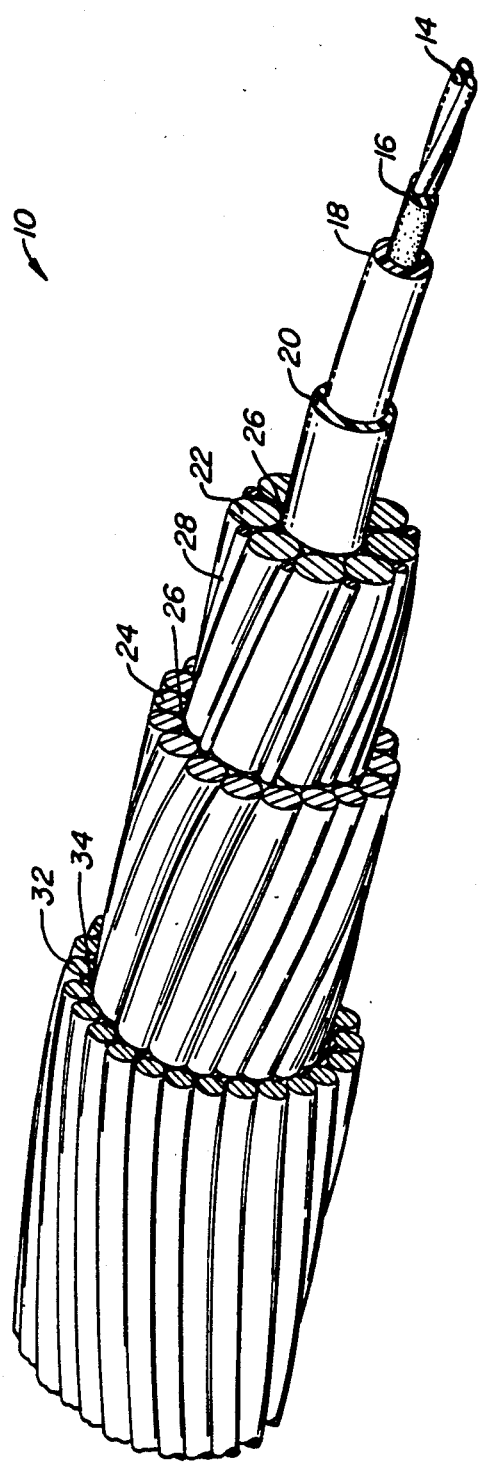
FIG._2.

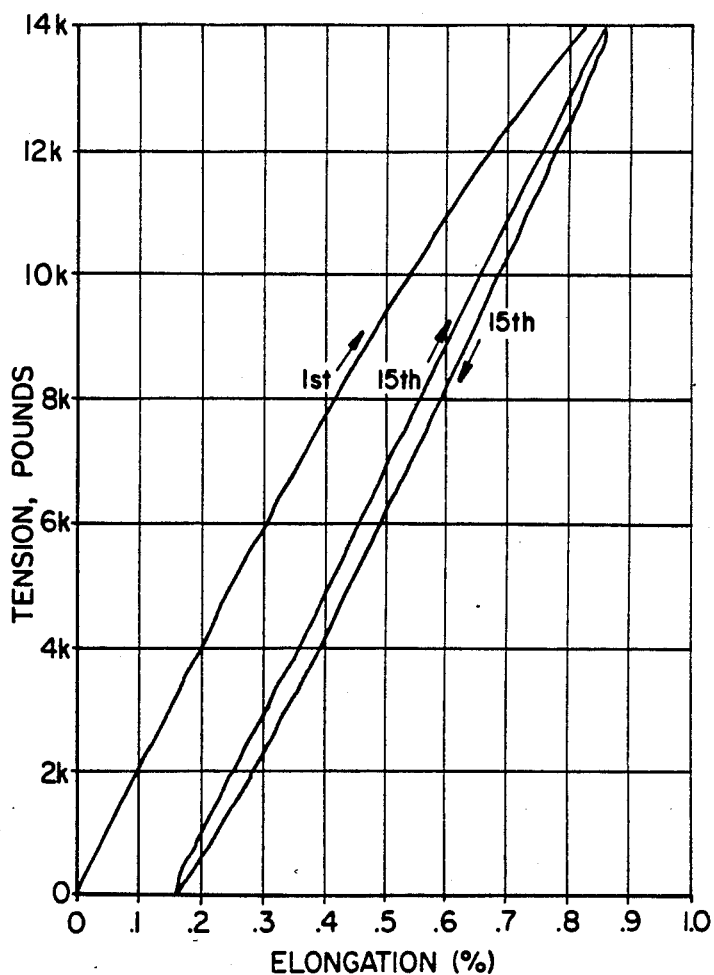
FIG._3.
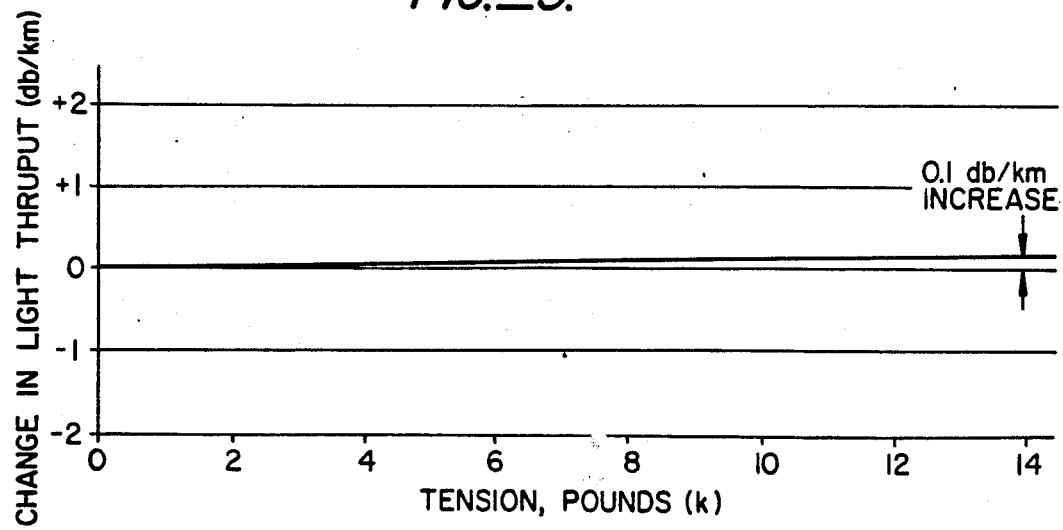
FIG._4.

ARMORED OPTICAL FIBER CABLE

This application is a continuation-in-part of application Ser. No. 408,975, filed on Aug. 17. 1982.

This invention relates to armored cables. More specifically, this invention relates to armored optical fiber cables.

BACKGROUND OF THE INVENTION

Conventional electromechanical cables for oil well logging include insulated metal conductors for the transmission of electrical signals. Such cables have signal transmission bandwidths that are limited to about 100 KHz over lengths that correspond to typical depths of oil wells, 12,000 to 20,000 feet. Much of the information that is obtainable with modern logging tools is not retrievable from down the well bore due to the restricted signal bandwidth that is characteristic of state-of-the-art conventional logging cables. Consequently, a need exists to provide oil well logging cables that have substantially higher signal transmission bandwidths. Optical fibers can provide signal transmission bandwidths one to three orders of magnitude higher than the insulated wires that are used in conventional well logging cables.

Glass optical fibers have two properties which make it difficult to successfully incorporate them into strain cables. These properties are static fatigue degradation and microbending loss.

Silica glass fibers have small cracks (microcracks) on their surface. The depth of these microcracks can increase through a stress-accelerated chemical reaction between the silica glass and moisture, called static fatigue. The tensile strength of the glass fiber decreases substantially as the microcracks increase in depth. Glass is an elastic material with a high Young's modulus. Strain in a glass optical fiber generates tensile stress and results in static fatigue. Thus, glass optical fibers are not suitable for use under high strain (>0.5%) in the presence of moisture over extended periods of time.

Optical fibers transmit light signals by the principle of total internal reflection. This principal depends upon the light rays being totally reflected back into the core region each time they impinge upon the core to cladding interface of the optical fiber. Total internal reflection can only occur when the angle of incidence between the rays and the core to cladding interface is below a certain critical value. Bending of an optical fiber causes some of the light which is propagating in the fiber core to impinge upon the core to cladding interface at angles of incidence greater than the minimum value and to be refracted out of the optical core and lost. The amount of the light that is lost becomes greater as the effective diameter of the bend becomes smaller. When the bending of the optical fiber is caused by deflection due to local lateral forces, the resulting decrease in signal strength is called microbending loss. When an optical fiber is deflected by a local inhomogeneity, such as a lump in its coating layers, the effective diameter of the bend depends upon the local strain the fiber is under. Generally, the fiber will bend to a smaller effective diameter as the strain level it is under increases. Consequently, higher strain levels result in higher levels of microbending loss.

A necessary condition for accurate logging of a well bore is an accurate knowledge of the position of the logging tool within the well bore. The position of the tool is defined by the actual length of logging cable that is suspended in the well bore. The actual length of suspended cable can be determined from a knowledge of the amount of unstressed cable length that has been lowered into the well plus a knowledge of the elongation versus tension characteristics of the cable and the tension along the suspended cable length. The amount of unstressed cable length that has been lowered into the well bore can be precisely measured. The tension profile along the suspended length of cable can be accurately calculated. Therefore, the actual length of cable suspended in the well can be accurately determined if the elongation versus tension characteristics of the cable are accurately known and are repeatable.

Conventional electromechanical cables for well logging can be constructed to withstand harsh high temperature environments and to accept high levels of axial strain while still remaining functional. More specifically, for example, each conductor element in a conventional logging cable comprises a bundle of copper wires. The copper wires yield inelastically at low strain. When the cable is alternately stretched and relaxed, the copper does not fully return to its original state and eventually the copper wires become brittle, due to strain hardening, and break. However, even this serious condition does not necessarily render the cable inoperable because a break in one or more wires with adjacent non-broken wires permits the current to be passed to the neighboring wires and thus the conductor still appears whole and the cable remains functional. Thus, conventional logging cables can withstand considerable inelastic and elastic strain and still remain functional.

Well logging cables are generally constructed with two layers of external steel armor wires. The armor wires are preformed and applied in helices of opposing handedness to prevent the cable from unwinding when supporting a free hanging load. Inside the armored jacket can be seven insulated copper conductors laid six around one in helices generally of opposite handedness to those of the steel wires in the inner armor layer. However, there is no definite relationship between the helices of the copper conductors and those of the inner armor wires since they are added in separate fabrication steps and usually with a bedding layer of a pliant material therebetween. A result of this conventional cabling geometry is that the interface between the inner armor wires and the underlying insulated conductors consists of a multiplicity of cross-over points separated by the pliant bedding material.

When a conventional well logging cable is tensioned at elevated temperatures, it will elongate by an amount which is not acurately predictable. This is because the elongation consists of two parts, one that is linear and one that is highly nonlinear and inelastic. The inelastic part occurs because the armor wires inelastically deform the underlying compliant bedding and the wire insulation, due to very high local stresses at the cross-over points, and take on a smaller pitch diameter. The inelastic part of the cable elongation is not very predictable or repeatable and consequently the position of the logging probe will not be accurately known.

In order to prevent inelastic strain from occurring in use, conventional logging cables are given a hot prestretch during fabrication. When properly conducted, the hot prestretch operation will result in a cable that exhibits a linear and elastic elongation in response to tension. The hot prestretching operation imparts a permanent (inelastic) strain of between ¾ to 1¼ percent to conventional seven-conductor logging cables. Hot prestretching of a conventionally designed armored cable containing one or more optical fibers within its core would leave the glass optical fibers under a permanent elongation of ¾ to 1¼ percent. Optical fibers in cables subjected to these high permanent strain levels would soon fail from static fatigue and/or exhibit intolerably high microbending losses. It is apparent that conventional prestretching technology cannot be applied to armored optical fiber cables. Thus, it would be highly desirable to have an armored fiber optic cable which overcomes these and other difficulties and permits the expansion of optical fiber communications technology into areas of harsh environments.

SUMMARY OF THE INVENTION

I have invented a cable and method of fabrication which utilizes the combination of optical fiber means having a proof test stress value of at least about 150,000 pounds per square inch with a surrounding and protecting arrangement of helically wound strength elements in a construction that minimizes the inelastic part of the cable elongation by minimizing the deformability of the structure within the arrangement of strength elements. This arrangement of strength elements includes two torque balancing layers wound in opposite helical directions, and it is a feature of this invention that the construction has such a low permanent radial contraction under repeated loading to about 90% of the design breaking strength of the cable that its permanent elongation is no greater than about 0.4% and preferably 0.25% or less.

In a cable according to the invention, the interior construction is highly resistant to radial deformation without being so solid that the cable cannot perform properly under service conditions which require that it be bendable with ease and that it not unlay or kink in response to sudden changes in tension. It has been found important to hold the permanent radial deformation under repeated loads near the breaking strength (e.g., about 90% of breaking strength) to less than about 6%, and preferably less than 4%, of the inner diameter of the arrangement of strength elements.

With such a construction, the cable may be given a pre-stretch (e.g., at 70° F.) before being placed in service. The elastic elongation of the cable of the invention under load may be generally comparable to that of conventional well logging cables, so that users of the cable will not experience unacceptable problems. For example, an elastic elongation of no greater than about 0.7% under the design working load of the cable is suitable. Whereas in conventional well logging cables the permanent elongation component (generated during the prestretch) ordinarily is greater than the elastic elongation to be expected at the design working load, an opposite relation between the magnitudes of these two elongation components normally exists in cables according to the invention.

In accordance with one form of the invention an armored optical well logging cable is formed and has a design breaking strength of at least about 10,000 pounds for use in an environment which subjects the cable to repeated elongation and relaxation forces under tension along the length of the cable. The cable includes a substantially non-deformable central core containing at least one elongated optical fiber. The fiber has a proof test strain value which determines its maximum stretch limit. A working stretch limit for the fiber is selected based on reducing static fatigue of the fiber to a level which permits an acceptable lifetime and maintains microbending losses of the fiber at an acceptable level for the required transmission distance. An elongated helically coiled flexible means is tightly coiled around the core containing the optical fiber to form a cable with maximum elongation due to inelastic and elastic stretch at the design working load of the cable less than the aforesaid selected stretch limit of the fiber. The elongated helically coiled flexible means includes at least two torque balancing layers wound around the core in opposite helically directions with long lay lengths of at least three inches to provide low deformation of the helical windings during tensioning of the cable while permitting repeated bending of the cable around sheaves without substantial splaying of the flexible means. Generally, the optical fiber has a proof test value of at least 150,000 psi and the elongation of the cable is no more than about 50% of the stretch limit of the fiber at its proof test value. For applications where very long life of the fiber is desired the elongation of the cable should be no more than about 25% of the stretch limit of the fiber at its proof test strain value.

The cable preferably comprises at least two inner layers, including the inner armor, which are stranded in a "unilay" configuration of a given handedness around a central element. A "unilay" configuration is defined as a cable bundle wherein the element is in continuous contact with, and in the same orientation with respect to its nearest neighbors. The central bundle contains at least one optical fiber. The cross-sections of the central bundle are identical at every point along the cable, except for a rotation about the central axis. The unilay construction distributes the transverse forces continuously along the touching components instead of concentrating the forces at crossover points as in contrahelically formed layers of cable elements or layers of unidirectionally cabled elements that have different lay lengths. The lay length of the cable is long, preferably on the order of about 3.5 inches for a cable with an outside diameter of about 0.5 inch. The lay length should be increased in direct proportion as the diameter of the cable increases. "Lay length" is defined as the distance along the cable or helical axis traversed by one complete helical revolution of the element. The cable has at least one outer armor layer which is contrahelically wound around the central bundle. The outer armor layer is of opposite handedness to the central bundle and substantially balances the torque of the inner armor when the cable is under tension. The elements of the layers are hard and resistant to deformation. This means that any conductor elements contained in the cable preferably are single metal conductors and not multifilament conductors.

The layers in the central bundle are fabricated in a single operation with the same lay length and with the same handedness. The outer armored layer of opposite handedness is applied directly over the central bundle.

BRIEF DESCRIPTION OF THE DRAWINGS

FIG. 1 illustrates a cross-sectional view of an armored optical fiber cable.

FIG. 2 is a perspective view of the armored optical fiber cable shown in FIG. 1.

FIG. 3 is a graph illustrating percent elongation versus tension of a cable constructed in accordance with the invention.

FIG. 4 is a graph illustrating the change in light throughput, i.e. attenuation, versus tension in a cable constructed in accordance with the invention.

DETAILED DESCRIPTION OF THE INVENTION

The invention will be more clearly illustrated by referring to FIGS. 1 and 2. FIG. 1 illustrates an armored optical cable 10 of my invention. FIG. 2 is a perspective view of the cable of FIG. 1. The armored optical cable 10 will be described with respect to specific embodiments such as overall size, dimensions and materials used to fabricate a well logging cable which comes within the scope of the invention. However, the invention is not intended to be limited solely to the specific dimensions or materials used in the description nor to only well-logging applications. The described cable is useful in any application which requires minimum cable deformations under load.

Broadly the invention relates to providing an optical fiber well logging cable that is flexible so that it can be wound on a truck-mounted drum having a diameter as small as about 16 inches (and more commonly 24 to 32 inches) and bent over one or more well logging sheaves or the like of approximately the same diameter as the drum without kinking and which has elongation characteristics compatible with an acceptable lifetime of the optical fiber being utilized in the cable.

The presently available optical fibers vary in quality. Since this has an effect on the adaptability of particular fibers for use, it has become customary to characterize them in terms of "proof test" values. Proof testing normally is done in connection with the manufacture of an optical fiber to obtain proof that the fiber does indeed have the quality that will permit it to be tensioned for a short time to a desired degree without injury. To say, for example, that an optical fiber has a proof test stress value of 50,000 psi means that a proof test carried out under a 50,000 pounds per square inch tension on the optical fiber did not cause breakage or injury to the fiber. One now can obtain on a commercial basis optical fibers having proof test stress values of 50,000 psi on up to 200,000 psi and above. The higher proof test fibers are more expensive than the lower proof test fibers.

Efforts are now being made to produce hermetically sealed optical fibers in lengths suitable for well logging cables. It is expected that, if developed, hermetically sealed optical fibers may be utilized at strains much closer to their actual proof test values than conventional fibers. Thus a hermetically sealed fiber having a proof test value of as low as about 75,000 psi to 100,000 psi, could be utilized in accordance with the present invention whereas with conventional optical fibers a proof test of at least 150,000 psi is desirable. That is to say that it is expected that a hermetically sealed fiber having a proof test value of 100,000 psi may be the equivalent with respect to allowable cable strain of a 150,000 psi to 200,000 psi proof test conventional optical fiber.

The elastic stretch or strain associated with tensioning a typical optical fiber is on the order of 1% for each 100,000 psi of tension. Hence, one can relate a given proof test stress value to a strain which the optical fiber can safely be subjected for short periods.

As mentioned above, however, strains which persist over long periods of time may be detrimental to an optical fiber even where comparable strain levels would not be injurious on a short term basis. Therefore, the proof test strain value of an optical fiber is not a strain value to which a fiber should be subject for long periods.

In the use of an optical fiber well logging cable, the optical fiber means will be held under long term tension loads because of at least two important factors. First, the as-formed cable inevitably will be elongated permanently when subjected to loads within the range of loads encountered in well logging operations. Second, as a well logging cable is retrieved from a well and wound on a drum carried by a truck at the well site, the cable will be under tension, and a substantial amount of this tension will be preserved in the cable on the drum because the friction of the windings upon one another inhibits relaxation of the cable tension even when the load on the end of the cable has been removed.

In considering the amount of permanent elongation of a cable, it is appropriate to visualize the as-formed state of the cable as a state in which the optical fiber means within the cable is not under any substantial tension. This will be the sense of the references in this text to elongation quantities, even though it is recognized that it might be possible to operate a cable forming process in such a way that a significant amount of permanent elongation of the cable (with an accompanying permanently retained elastic elongation of the optical fiber means therein) would occur prior to the time when the cable is first wound on a drum. That is, an "as-formed" cable is to be understood to mean the cable in a condition in which it would exist if the optical fiber means were not significantly strained, and a reference in this text to percent elongation is to be understood to mean an increase in the length of the as-formed cable divided by the length of the as-formed cable.

The cable of the present invention can be understood as including optical fiber means within and protected by a compact arrangement of layers of helically wound strength elements in the form of armor wires. Typically, the armor wires are galvanized steel wires which give the cable adequate abrasion and corrosion resistance and the strength required for raising and lowering logging tools into wells. The tensile loads involved include not only the weight of the tools and the weight of whatever cable may have been lowered into the well (e.g., over 20,000 feet in some instances) but also acceleration loads and forces generated through friction and snagging phenomena.

For practical operations in ordinary well logging service such a cable should have a design breaking load of at least about 10,000 pounds and preferably 12,000 to 15,000 pounds or more. The design working load is of course less than the design breaking load, and the term design working load as used here may be understood to mean seven-tenths of the design breaking load, which in turn may be understood to mean the calculated breaking strength of all the armor wires.

The armored optical cable 10 has a central core 12. The central core 12 has an outer diameter of about 0.120 inches ±1%. The central core comprises one or a plurality of optical fibers 14. The optical fibers 14 can be single-mode or multimode fibers, or mixtures thereof. Each of the fibers should have proof test stress values at least as high as about 150,000 psi. The optical fibers are surrounded by a cushioning material such as an elastomeric cushioning material, for example, silicon elastomers and the like. If the central core comprises a plurality of optical fibers, the optical fibers should preferably be stranded together with the same helical handedness and lay length as the elements 22 and the inner armor wires 24 of the central bundle 30. For example, the three fibers illustrated have a right-handed lay sense and about a 3.5 inch lay length (1.2° lay angle). In the illustrated embodiment, the three-fiber assembly is embedded in and surrounded with a compliant, resilient material 16 such as silicone RTV. The coated fibers are further coated with a hard, stiff jacket 18 of a material such as a fiberglass-epoxy matrix. The jacket 18 has an outer diameter of about 0.094 inches ±2%. A suitable glass-epoxy jacket material is fabricated under the name of Stratoglas ®, a product of the Air Logistics Corporation of Pasadena, Calif.

Surrounding the hard, stiff jacket 18 is an outer jacket 20 of material such as polyvinylidene (Kynar ®, a product of the Pennwalt Company), perfluoroalkoxy (PFA Teflon ®, a product of the DuPont Corporation), polyetheretherketone, (PEEK ®, a product of ICI), or similar material. The outer jacket 20 should be of a sufficient thickness so that the central core 12 has the appropriate outer diameter of about 0.120 inches ±1%.

Alternatively, the cable 10 would have a central core 12 of a gas pressure tight type cable of the appropriate diameter illustrated in U.S. Pat. No. 4,312,565, incorporated herein by reference. Another alternative is to have a central metal tube of the appropriate diameter with one or more optical fibers therein. Still another alternative protected optical fiber within in a metal tape is sold under the name Opticore ®, a product of the Olin Corporation.

In the preferred embodiment, the space for the central core 12 is formed by at least six elements 22, such as conductor strands, layed around the central core 12 with a right-handed lay sense and a 3.5 inch lay length (9.8° lay angle). To obtain a larger diameter for the central core 12, more conductor strands, e.g., eight, as illustrated, are used to fabricate the space for the central core 12. The conductor strands 22 should be fabricated from material which minimizes deformation and is capable of interlocking with the inner armor 24. Suitable conductor strands are solid copper covered steel wire having a diameter of about 0.0403±1%. The conductor strands should have a minimum conductivity of 60% minimum of International Annealed Cooper Standard (IACS) with a yield strain of about 0.9% minimum at 0.2% offset. A material meeting these requirements is Copperweld ®. The solid copper covered steel wire is coated with an insulator such as Kynar ® to an outer diameter of about 0.071 inches. The central core 12 and the conductor strands 22 should have a combined outer diameter of about 0.262 inches.

An alternative embodiment is to fabricate the cable with a solid central core 12 having about 0.120 inches O.D. ±1% with a conductivity of 30% minimum of IACS, and a yield strain of about 0.9% minimum at 0.2% offset. In this embodiment, the elements 22 contain several central optical fibers surrounded with a suitable protective jacket. A suitable element 22 has a central optical fiber with about a 125 micron diameter with the silicon RTV coating it to a thickness of about 325 microns O.D. and with a Hytrel ®, a product of Du Pont, coating to an O.D. of about 500 microns ±5%. A suitable glass optical fiber meeting these requirements has been made by ITT Corporation. Another suitable element 22 is Opticore ®. A glass-epoxy matrix is applied over this optical fiber to an O.D. of about 0.040 inches ±2% and Kynar ® or other suitable coating is applied over the glass-epoxy matrix to an O.D. of about 0.071 inches ±1%. Assuming eight elements 22, up to three of the elements would be the optical fibers and the other elements are conductor strands such as Copperweld ®. Preferably, the optical fibers are integrated among the eight elements.

At least twice the number of inner armor wires 24 surround the conductor strands 22 in the illustrated embodiment. In this preferred embodiment, sixteen inner armor wires 24 should be of a drawn, galvanized, improved plow steel rope wires (AISI) or other suitable material with a diameter of about 0.0575 inches ±1%, minimum tensile strength of about 244 KPSI minimum torsions (8") of about 39, and a coating adherence as evidenced by a 3D mandrel wrap test. The inner armor wires 24 are layed as part of the central bundle 30 with a right-handed lay sense and a 3.5 inch lay length (15.5° lay angle). The central bundle 30 has an outside diameter of about 0.368 inches. It is important that the sixteen inner armor wires 24 be electro-galvanized with bright and smooth finishes such as a minimum zinc coating of about 0.2 oz./ft.$^2$. The inner armor wires 24 lie adjacent to the insulated conductors and hence must provide a smooth interface for transferring compressive loads to the insulated wires.

A suitable protective material 26 for the intended environment of the cable 10 is applied during the fabrication of the central bundle 30 out to the inner armor 24. Suitable materials for a well logging cable are nitrile rubber based filling compounds and the like. The inner armor wires 24 are wound around the conductor strands 22 as illustrated to provide room for eight intersticial elements 28. The eight intersticial elements 28 are optional and can be either a corrosion inhibitor lubricant 26, such as TMS 5878 Compound, a product of Quaker Chemical Company, or wires or insulated conductors or jacketed optical fibers. The intersticial elements 28 are layed with the same lay sense as conductor strands 22 and inner armor wires 24. The intersticial elements 28 are cabled with a right-handed lay sense and a 3.5 inch lay length (12.5° lay angle). The intersticial elements 28 must have a maximum outside diameter of about 0.028 inches minimum zinc coating of about 0.1 oz./ft.$^2$, minimum tensile strength of about 251 KPSI, minimum torsions (8") of about 83, and a coating adherence as evidenced by 2D mandrel wrap test. If the intersticial elements 28 are used to control the placement of the inner armor wires 24, then the elements 28 should preferably be fabricated out of materials which are smooth, round, and deformation resistant such as solid, bright, galvanized wires or structually rigid engineering plastics such as Kynar ®, PFA ®, PEEK ®, and the like. It important that any intersticial elements 28 have a rounded and smooth external surface since they lie adjacent to the insulated conductor strands and must provide a smooth surface for transferring compressive loads to the insulated strands.

A unique feature of the armored optical cable 10 is the fact that the elements of the central bundle 30 are fabricated with the same lay length and handedness so that they nestle together and do not crossover each other. Another unique feature is the fact that the conductor strands 22 and the inner armor wires 24 are assembled in the same operation so that the elements 22 and 24 rest on each other and not in the grooves formed between the conductor strands 22. This construction gives the cable greater flexibility and reduces friction between the conductor strands 22 and the inner armor wires 24. These features provide for minimal deformation of the interface between the elements and hence minimal inelastic elongation of the cable.

Surrounding the inner armor wires 24 and forming the outside diameter of the cable 10 is at least one layer of outer armor wires. Illustrated in the preferred embodiment are twenty-four strands of outer armor wires 32. The outer armor wires 32 should be fabricated from galvanized, improved plow steel rope wires (AISI) or other suitable materials have a diameter of about a 0.049" ±1%; a minimum zinc coating of about 0.4 oz./ft.$^2$, as test per ASTM A-90, a minimum tensile strength of about 246 KPSI, as test per ASTM E-8, a minimum torsions (8") of about 47, as test per FED SPEC RR-W-410; and an adherence of coating which meets paragraph 9 of ASTM A-641 using a 3D mandrel. The wires 32 are preferably preformed and layed with a lay sense opposite that of elements 22 and 24. For this example, the lay handedness of the outer armor wires 32 should be a left-handed lay sense and a 3.5 inch lay length (20.5° lay angle). As the outer armor wires 32 are being applied, the central bundle 30 is coated with a corrosion-resistant and lubricating material 34 such as TMS5878, and the like. The overall dimensions of the optical cable 10 will be about 0.469 inches.

The preferred armored optical cable 10 described herein is fabricated in one in-line operation. The central bundle 30 is formed from one bay of planetary bobbins and the outer armor wires 32 are applied directly over the central bundle 30 from a tandem bay of planetary bobbins. The outer armor wires 32 are applied in an opposite handedness such that the torques exerted by said inner and outer armor wires are substantially balanced. A suitable method of balancing the contrahelically wound outer armor wires 32 and the inner armor wires 24 is disclosed in U.S. Pat. No. 4,317,000, completely incorporated herein by reference. The machines which fabricate the cable of my invention are known in the art as planetary cabling machines. A suitable source for the fabrication of the cable is Blake Wire and Cable Company of Torrence, Calif. Of course, the cable can also be fabricated by a tube winder cabling machine; however, the outer armor wires will have to be applied in a separate step.

FIG. 3 is a graph illustrating percent elongation versus tension in a fiber optic well logging cable made in accordance with the specifications recited herein. The cable contained three elongated optical fibers. Each fiber had a proof test value of 200,000 psi. The cable had a design breaking strength of 15,000 pounds. A maximum design working load (at 70% of the cable breaking load) was 10,500 pounds. The 200,000 psi proof test fiber could be stretched at least 2% before breaking.

FIG. 3 shows the 1st and the 15th cycle of the tests. By the 15th cycle, the cable had inelastically stretched about 0.16%, and inelastic stretch did not increase substantially thereafter. This permanent inelastic stretch of the cable causes the optical fibers 14 to be permanently tensioned in an elastic manner. Additional long term strain on the optical fibers in service will result from the existence of residual elastic strain in the cable on the winding drum. Residual winding drum cable strains that are reasonable to anticipate can be 0.15% or more. Thus, it is to be anticipated that the optical fibers may be held for prolonged periods of time, and possibly under high moisture conditions, at strains in excess of no more that about 0.3%, a figure which is quite compatible with minimal risk of static fatigue degradation. Acceptable results can be achieved at somewhat higher permanent optical fiber elongations. A cable construction in which the permanent elongation due to inelastic deformations in the as-formed cable is less than about 0.4% is suitable but constructions having permanent elongations less than 0.25% are preferred in light of the need for guarding against degradations associated with the uniquely harsh service conditions for well logging cables.

However, merely protecting the optical fibers from strain is not sufficient to produce a viable cable if the design results in optical signal attenuation increase which will not permit the light signal from the well logging probe to travel through the cable back up to the surface. An acceptable optical signal attenuation increase (microbending loss) due to repeated loading to about 90% of design breaking load is less than about 0.5 db/km and preferably less than 0.2 db/km.

The cable design described herein protects the optical fibers even at tensions which are greater than the design working load. FIG. 4 is a graph illustrating the variation in light transmission versus tension on about a 130 foot section of the fiber optic cable used to produce the graph in FIG. 3. The graph shows an increase in optical signal attenuation of only 0.1 db per kilometer (minimum measurable by the test equipment) at 14,000 pounds on the 27th cycle of tensioning the cable 0 to 14,000 pounds. Thus, an extrapolation of the signal attenuation indicates an additional loss of signal strength of only about 0.9 db for a 30,000 foot optical fiber well logging cable.

In addition to being resistant to long term degradation, the cable also protects the optical fiber means well from breaking loads of the types to be expected in service. The total elongation of the cable at 10,000 pound design working load was about 0.7%. Thus, the cable stretch limited the stretch of the fiber to less than 35% of the stretch of the fiber at its proof test value.

Having described my invention with respect to a particularly preferred embodiment and some preferred alternatives, it should be understood that the invention is not intended to be limited solely to the description therein. Modifications which would be obvious are intended to be within the scope of the invention. For example, the cable is not limited to any specific diameter, number of optical fibers, and the like. A different environment or job application which required a larger load placed on the cable could require a larger diameter cable with larger and/or more conductor strands, inner armor wires or outer armor wires.

What is claimed is:

1. An abrasion resistant well logging cable having a design breaking load at least as great as about 10,000 pounds, and being adapted to be wound repeatedly about sheaves and wound and unwound from a drum, said cable comprising the combination of:

optical fiber means having a proof test stress value of at least about 150,000 pounds per square inch;

and a compact arrangement of layers of helically wound strength elements surrounding and protecting said optical fiber means; said arrangement having such a low permenant radial contraction under repeated loading to about 90% of the design breaking load that said cable's permanent elongation after being stretched repeatedly to about 90% of the design breaking load is no greater than about 0.4% and including at least two torque balancing layers wound in opposite helical directions.

2. An abrasion resistant optical fiber well logging cable according to claim 1 where the elastic elongation under the design working load is less than about 0.7%.

3. An abrasion resistant optical fiber well logging cable according to claim 2 where said permanent elongation is less than 0.25%.

4. An abrasion resistant optical fiber well logging cable having a design breaking load at least as great as about 10,000 pounds, and being adapted to be wound repeatedly about sheaves and wound and unwound from a drum, said cable comprising the combination of:
   optical fiber means having a proof test stress value of at least about 150,000 pounds per square inch;
   and a compact arrangement of layers of helically wound strength elements surrounding and protecting said optical fiber means; said arrangement having a permanent radial contraction under repeated loading to near the design breaking load of less than about 6% of the inner diameter of said arrangement of strength elements and including at least two torque balancing layers wound in opposite helical directions.

5. An abrasion resistant optical fiber well logging cable according to claim 4 wherein said permanent radial contraction is less than 4% of the inner diameter of said arrangement.

6. An abrasion resistant optical fiber well logging cable according to claim 5 wherein the elastic elongation of said cable under the design working load is less than about 0.7%.

7. An abrasion resistant optical fiber well logging cable according to claim 6 wherein the increased optical attenuation due to repeated loading to about 90% of design breaking load is less than about 0.5 db/km.

8. An abrasion resistant optical fiber well logging cable according to claim 7 wherein the increased optical attenuation due to repeated loading to about 90% of design breaking load is less than about 0.2 db/km.

9. An armored optical well logging cable having a required transmission distance and a design breaking strength of at least about 10,000 pounds for use in an environment which subjects said cable to repeated elongation and relaxation forces under tension along the length of said cable, said cable comprising: a substantially non-deformable central core containing at least one elongated in optical fiber, said fiber having a proof test value of at least 150,00 psi and a selected allowable stretch limit less than said fiber's proof test strain value based on reducing static fatigue of the fiber to a level which maintains microbending losses of the fiber at an acceptable level for the required transmission distance, and an elongated helically coiled flexible means tightly coiled around said core, said flexible means comprising a plurality of elements arranged such that interfaces between said elements are substantially parallel to minimize deformation of said elements during tensioning of the cable by distributing transverse forces continuously along said elements, and at least one torque balancing layer wound around said flexible means in an opposite helically direction to permit repeated bending of the cable around sheaves without substantial splaying of said cable to form a cable with maximum elongation due to inelastic and elastic stretch at the design working load of said cable less than 50% of the selected allowable limit of the fiber.

10. The optical well logging cable of claim 9 wherein the elongation of said cable is no more than about 25% of the fiber at its proof test strain value.

* * * * *